R. H. McCORMICK & W. R. BAKER.

WRENCHES.

No. 7,173. Reissued June 13, 1876.

WITNESSES

Wm A Skinkle

J. Stiell

INVENTORS

R Hall McCormick & Wm R Baker.

By their Attorney

Wm D. Baldwin

N. PETERS, PHOTO-LITHOGRAPHER, WASHINGTON, D. C.

UNITED STATES PATENT OFFICE.

ROBERT H. McCORMICK AND WILLIAM R. BAKER, OF CHICAGO, ILLINOIS; SAID BAKER ASSIGNOR TO SAID McCORMICK.

IMPROVEMENT IN WRENCHES.

Specification forming part of Letters Patent No. 166,020, dated July 27, 1875; reissue No. 7,173, dated June 13, 1876; application filed May 31, 1876.

*To all whom it may concern:*

Be it known that we, ROBERT HALL McCORMICK and WILLIAM R. BAKER, both of Chicago, in the county of Cook and State of Illinois, have invented certain new and useful Improvements in Wrenches, of which the following is a specification:

Our invention relates to wrenches of that class in which one portion is movable or adjustable upon the other by means of a screw-nut, and has for its object to cheapen and simplify their manufacture.

The subject-matter claimed will hereinafter specifically be designated.

Figure 1:
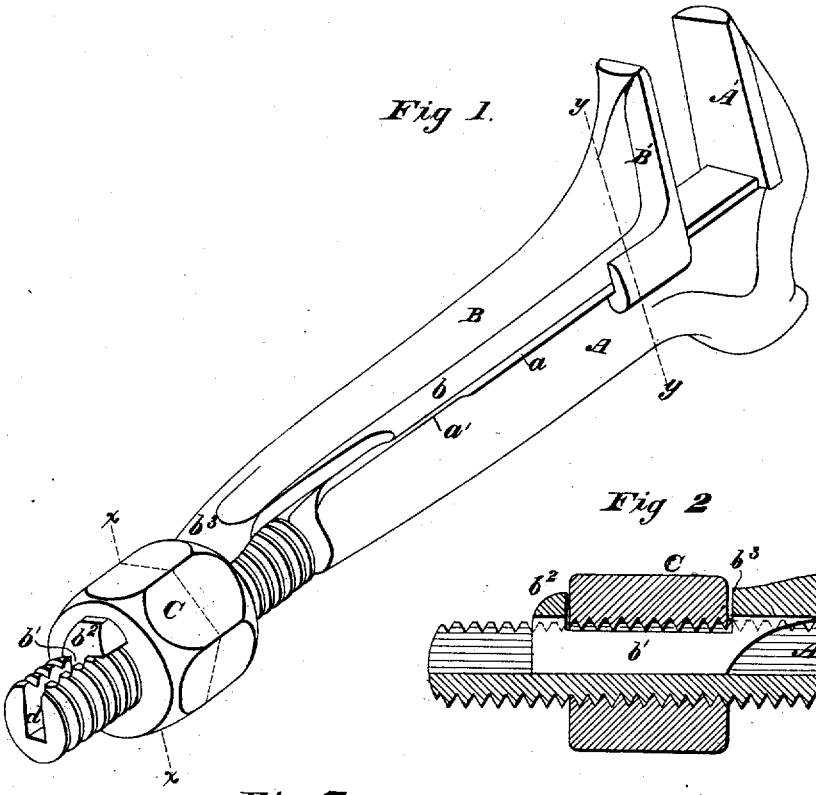
Figure 2:
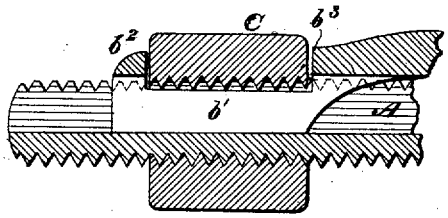
Figure 3:
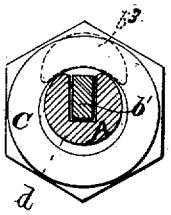
Figure 4:
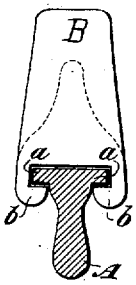

In the accompanying drawings, Figure 1 represents a view in perspective of our improved wrench; Fig. 2, a vertical longitudinal section through the outer or handle end thereof; Fig. 3, a transverse section on the line *x x* of Fig. 1; and Fig. 4 a similar section on the line *y y* of Fig. 1.

The main portion A of the wrench is provided with the usual head or jaw A′, and with flanges or guideways *a a*. A longitudinal groove, *d*, is formed in the handle, the object of which will presently be explained. The movable portion B of the wrench is provided with the usual head or jaw B′, between which and the jaw of the main portion the nut or other object to be operated upon is clamped. Flanges or projections *b* on this jaw interlock with the flanges or guideways *a* on the lower jaw, being grooved for this purpose, by which means the parts are securely held together, while capable of moving freely longitudinally upon each other. For greater security against lateral displacement, the movable portion B is provided with a depending tongue, $b^1$, which works in the longitudinal groove *d* of the portion A. The outer end of the portion B terminates in an upwardly-projecting lug or shoulder, $b^2$. A nut, C, encompasses screw-threads upon the outer end of the handle A, and also envelops the outer end of the movable portion B, the object of which construction is that, as the nut is rotated in one direction, the heads or jaws of the wrench will be caused to approach each other, by the nut acting upon the shoulder $b^3$ of the portion B to clamp any object over which they are placed, or by rotating it in the opposite direction the jaws will be drawn apart by the nut acting on the shoulder $b^2$. The shoulder $b^2$ on the end of the portion B necessitates the placing of the nut over it before the latter is screwed upon the threads of the main portion A.

The portion B can readily be attached or detached, as the flanges *a* are cut away at *a′* to permit of the passage of the locking lugs or flanges *b*.

We contemplate manufacturing our wrench of malleable metal, and without the usual handle.

Our invention secures a wrench easily and cheaply manufactured, effective in operation, and not liable to get out of order.

It will be obvious that the flanges and grooves on the respective portions of the wrench may be transposed—that is, the straight flanges may be formed upon the portion B, and the grooved flanges upon the portion A, without departing from the spirit of our invention.

What we claim as of our invention is—

1. The combination, substantially as hereinbefore set forth, of the main portion of the wrench provided with a jaw, guideways, and a screw, with a movable portion provided with corresponding interlocking guides, and a nut inclosing the two.

2. The improved wrench, hereinbefore set forth, consisting of the combination of the main portion provided with a jaw, guide-flanges, a longitudinal guide-groove, and a screw, a movable portion provided with a jaw, guide-flanges interlocking with the main portion, and a tongue working in the guide-groove, and a screw-nut working on the main portion, and over the sliding portion, for the purposes specified.

R. HALL McCORMICK.
WM. R. BAKER.

Witnesses:
JOHN V. A. HASBROOK,
JAMES H. SHIELDS.